(12) United States Patent
Ohkubo

(10) Patent No.: US 8,014,631 B2
(45) Date of Patent: Sep. 6, 2011

(54) IMAGE PROCESSING APPARATUS, IMAGE PROCESSING METHOD, AND COMPUTER READABLE MEDIUM FOR GENERATING A REDUCED IMAGE

(75) Inventor: Hiroshi Ohkubo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1302 days.

(21) Appl. No.: 11/637,122

(22) Filed: Dec. 12, 2006

(65) Prior Publication Data
US 2007/0268499 A1    Nov. 22, 2007

(30) Foreign Application Priority Data
May 18, 2006    (JP) .............................. 2006-138467

(51) Int. Cl.
G06K 9/32    (2006.01)

(52) U.S. Cl. ........ 382/298; 382/276; 382/293; 382/299; 382/300; 358/1.1; 358/1.2; 358/448; 358/451; 358/525

(58) Field of Classification Search .................. None
See application file for complete search history.

(56) References Cited

U.S. PATENT DOCUMENTS

| | | |
|---|---|---|
| 4,858,018 A | 8/1989 | Tanaka |
| 5,317,417 A | 5/1994 | Yamamura et al. |
| 6,005,988 A * | 12/1999 | Schroeder ...................... 382/298 |
| 2003/0081225 A1* | 5/2003 | Nakami et al. .................. 358/1.2 |
| 2003/0231345 A1 | 12/2003 | Azami |
| 2007/0035747 A1* | 2/2007 | Ishii et al. ...................... 358/1.2 |

FOREIGN PATENT DOCUMENTS

| | | |
|---|---|---|
| JP | A-2-302172 | 12/1990 |
| JP | A-5-48881 | 2/1993 |
| JP | B2 2543267 | 7/1996 |
| JP | B2 2615625 | 3/1997 |
| JP | B2 2831573 | 9/1998 |
| JP | A 2000-293676 | 10/2000 |
| JP | A-2001-188900 | 7/2001 |
| JP | A 2003-285475 | 10/2003 |
| JP | A 2004-336681 | 11/2004 |
| JP | A 2005-301881 | 10/2005 |
| JP | A 2006-050090 | 2/2006 |

OTHER PUBLICATIONS

Apr. 1, 2011 Office Action issued in Japanese Patent Application No. 2006-138467 (with translation).

* cited by examiner

*Primary Examiner* — Sath V Perungavoor
*Assistant Examiner* — Jason Heidemann
(74) *Attorney, Agent, or Firm* — Oliff & Berridge, PLC

(57) ABSTRACT

An image processing apparatus that generates a reduced image from input image data, which includes: a reducing process dividing section that divides a reducing process applied to get the reduced image from input image data into a first and second reducing process; and an image reducing section that executes the reducing process in compliance with the first and second reducing process.

4 Claims, 6 Drawing Sheets

● PIXEL AFTER THE REDUCING PROCESS

● PIXEL AFTER THE REDUCING PROCESS

IMAGE PROCESSING APPARATUS, IMAGE PROCESSING METHOD, AND COMPUTER READABLE MEDIUM FOR GENERATING A REDUCED IMAGE

BACKGROUND

1. Technical Field

The present invention relates to an image processing apparatus for generating a reduced image from input image data, an image processing method, and an image processing program capable of causing the image processing apparatus to execute an image processing that generates a reduced image from input image data.

2. Related Art

On account of a reduction in cost and an increase in capacity of the hard disk drive, a function of holding input image data in an internal or external hard disk drive is also added to the image processing apparatus equipped with a scanning function, a copying function, and a printing function. In such image processing apparatus, as the method of displaying the contents of respective image data when the image data being held once should be output again, two methods, i.e., the method of listing the names of the image data and the method of displaying reduced images called normally the thumbnail are considered. From such a viewpoint that the user can check the contents of the image data with the eyes owing to a colorization and a higher definition of the display device, it is quite certain that the method of displaying the image by using the thumbnail becomes the main current in the future.

SUMMARY

According to an aspect of the present invention, an image processing apparatus that generates a reduced image from input image data, which includes: a reducing process dividing section that divides a reducing process applied to get the reduced image from input image data into a first and second reducing process; and an image reducing section that executes the reducing process in compliance with the first and second reducing process.

BRIEF DESCRIPTION OF THE DRAWINGS

Exemplary embodiment of the present invention will be described in detail based on the following figures, wherein.

DETAILED DESCRIPTION

Various preferred embodiments of the present invention will be explained with reference to the drawings hereinafter.

Figure 1:
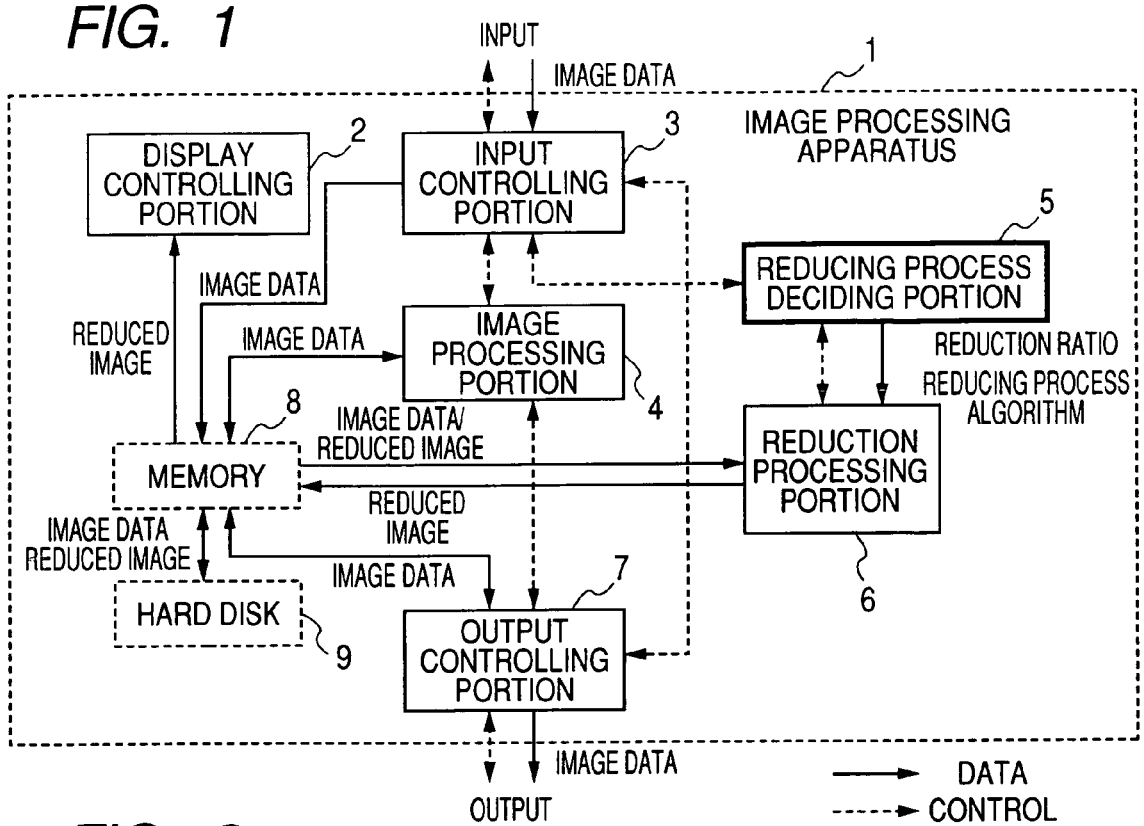
FIG. 1 is a schematic block diagram showing an image processing apparatus.

FIG. 1 is a diagram showing a schematic block configurative example of an image processing apparatus 1 as a first embodiment of the present invention.

As the conditions, the case where all input image data are the effective pixel and also the process in units of page is used as a processing mode is assumed.

The image processing apparatus 1 is employed to scan, copy, or print the image as the object. Concretely, the image processing apparatus 1 is accomplished by a scanner, a coping machine, a printer, a facsimile, or a multi-function machine (the scanner, the facsimile, the printer, and the like are integrated).

Respective processing portions constituting the image processing apparatus 1 are a display controlling portion 2, an input controlling portion 3, an image processing portion 4, a reducing process deciding portion 5, a reduction processing portion 6, an output controlling portion 7, a memory 8, and a hard disk 9.

As shown in FIG. 1, a flow of data is indicated with a solid-line arrow, and a flow of control is indicated with a dotted-line arrow. The processing portion on the root side of the dotted-line arrow applies the control to the processing portion on the head side of the arrow. The two-directional arrow indicates that both processing portions transfer the data or apply the control mutually.

Here, normally the processing portion denotes the parts or the module such as logically separable hardware, software, etc. Therefore, the processing portion in the present embodiment denotes not only the processing portion in a hardware configuration but also the processing portion in the program. As a result, explanation of the present embodiment is also given as those of the apparatus, the program, and the method. Also, the processing portion corresponds substantially to the function on a one-to-one basis. However, in the implementation, one processing portion may be constructed by one program or a plurality of modules may be constructed by one program, and conversely one processing portion may be constructed by a plurality of programs. Also, a plurality of processing portions may be executed by one apparatus, or one processing portion may be executed by a plurality of apparatuses located in the distributed or parallel environment. Also, the term "connection" includes a logical connection as well as a physical connection.

Also, the apparatus contains the case where such apparatus is implemented by one apparatus and the case where such apparatus is constructed by connecting a plurality of hardwares, a plurality of devices, etc. via the network, or the like.

The input controlling portion 3 of the image processing apparatus 1 inputs the image data by exchanging control information with the external device (the scanner, the communication medium, or the like). The input controlling portion 3 stores the image data in the memory 8. Also, the input controlling portion 3 is connected to the image processing portion 4, the reducing process deciding portion 5, and the output controlling portion 7, and exchanges the control mutually.

The image data stored in the memory 8 is stored in the hard disk 9, acts as the object of the image processing in the image processing portion 4, acts as the object of the reducing process in the reduction processing portion 6, or acts as the object of the output from the output controlling portion 7. Also, the memory 8 receives the reduced image that is reduced by the reduction processing portion 6 and stores it therein, and also transfers the reduced image to execute the reducing process again in the reduction processing portion 6. The reduced image in the memory 8 is displayed on the display device by the display controlling portion 2, so that the operator of the image processing apparatus 1 can view the thumbnail of the target image. Conversely, the memory 8 expands the image data or the reduced image sent from the hard disk 9 thereon, and receives the image data from the image processing portion 4 or the output controlling portion 7.

The image processing portion 4 applies the image processing to the image data stored in the memory 8 under control of the input controlling portion 3 or the output controlling portion 7, and stores the result in the memory 8.

The output controlling portion 7 receives the image data from the memory 8, and outputs the image data to the external device by exchanging control information with the external device (the printer, the communication medium, or the like). Also, the output controlling portion 7 is connected to the input controlling portion 3 and the image processing portion 4, and exchanges the control mutually.

The reducing process deciding portion 5 is connected to the input controlling portion 3 and the reduction processing portion 6, and exchanges the control mutually. Also, the reducing process deciding portion 5 transfers a reduction ratio, a reducing process algorithm, and the format of the input image data, and parameters necessary for the process depending on its processing mode to the reduction processing portion 6.

In the present embodiment, the reduction processing portion 6 is connected to the reducing process deciding portion 5 and the memory 8, and exchanges the control mutually with the reducing process deciding portion 5. Also, the reduction processing portion 6 receives the reduction ratio, the reducing process algorithm, and the input image data, and parameters necessary for the process depending on its processing mode from the reducing process deciding portion 5, and applies the reducing process to the image data stored in the memory 8 or applies the reducing process again to the reduced image.

The reducing process deciding portion 5 determines a reduction ratio of the reduced image based on a page size of the input image data, irrespective of the input mode of the scanning function, the copying function, and the printing function in the image processing apparatus 1. Also, the reducing process deciding portion 5 divides the reduction ratio into two stages, and informs the reduction processing portion 6 of the reduction ratio to cause it to execute the reducing process.

Then, the reducing process deciding portion 5 informs the reduction processing portion 6 of the parameters required to execute the process depending on the format of the input image data and the processing mode at a time of starting the first reducing process, and causes it to execute the reducing process.

Accordingly, the reduction processing portion 6 reduces the image data of the reducing object twice based on the reducing process parameters instructed by the reducing process deciding portion 5. Thus, the final reduced image can be obtained.

Figure 2:
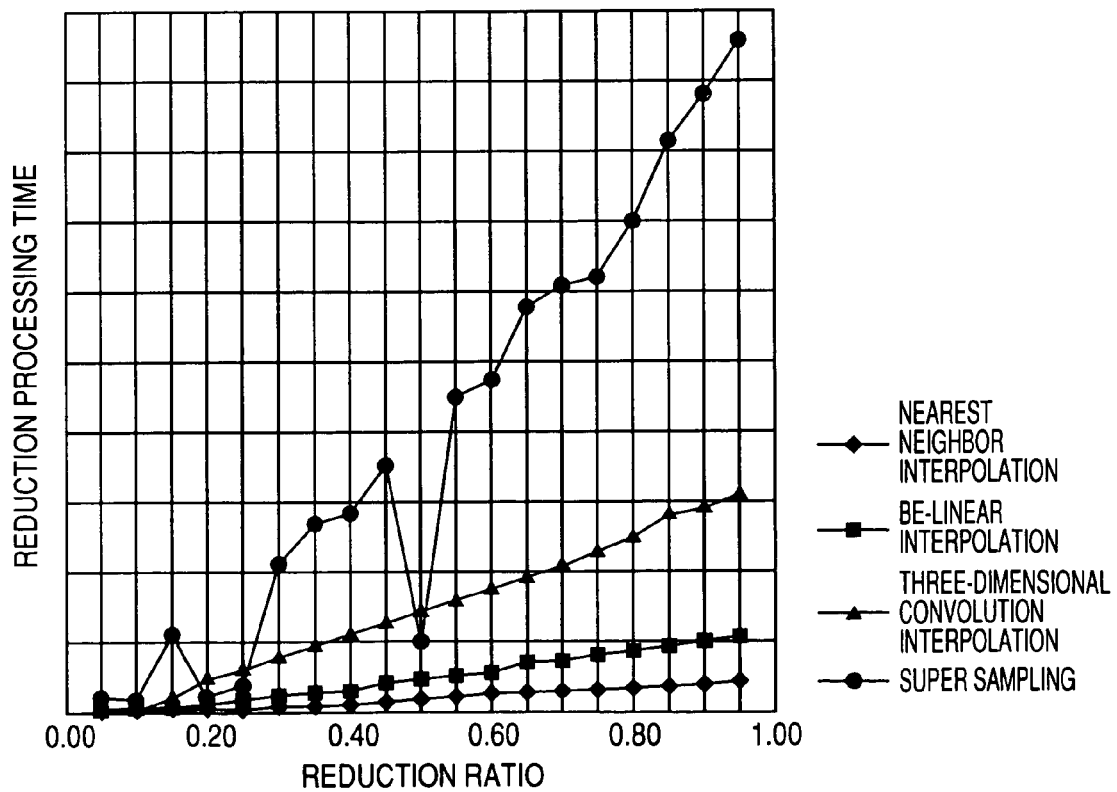
FIG. 2 is a graph showing an example of a relationship between a reduction ratio and a processing time in respective reducing process algorithms.

Here, as the common algorithm of the reducing process, the nearest neighbor interpolation, the bi-linear interpolation, the three-dimensional convolution interpolation, and the like are cited in order of higher processing speed. These three algorithms (interpolations) are started to calculate the pixels prior to the reducing process corresponding to the pixels of the image data after the reducing process from the reciprocal of the reduction ratio. But there is no guarantee that the reciprocal of the reduction ratio is always given as an integral number. Therefore, the nearest neighbor interpolation calculates such pixels from the pixel values nearest to the calculated coordinate, the bi-linear interpolation calculates such pixels from the pixel values of four pixels surrounding the calculated coordinate, and the three-dimensional convolution interpolation calculates such pixels from the pixel values of sixteen pixels surrounding the calculated coordinate. A processing time becomes shorter linearly as a reduction ratio becomes smaller (see FIG. 2). FIG. 2 is a graph showing a relationship between a reduction ratio and a processing time in respective reducing process algorithms, wherein an abscissa denotes a reduction ratio extended from 0 to 1 and an ordinate denotes a reduction processing time indicating that a much time is consumed in an upper area.

In contrast, as the reducing process algorithm of high picture quality, there is Super Sampling supported by IPP (Integrated Performance Primitive) of Intel (trademark). In above three interpolations, the pixels that are not referred to calculate the pixel values after the reducing process take place when a reduction ratio is reduced smaller than a certain value. For example, the pixels that are not referred to take place when a reduction ratio is smaller than 0.5 in the bi-linear interpolation or 0.25 in the three-dimensional convolution interpolation. On the contrary, in Super Sampling, the high picture quality can be attained by the same algorithm as the projection method such that the area before the reducing process corresponding to the pixels of the image data after the reducing process is calculated and then an average value of all pixels contained in that area is calculated.

However, sometimes Super Sampling is slower in a processing speed than above three interpolations, and a relationship between a reduction ratio and a processing time is not linear and a processing speed can be improved at particular reduction ratios (see FIG. 2). For example, Super Sampling has the almost same processing time as other interpolations at the reduction ratio of 0.10 or less, and has the higher processing time than the three-dimensional convolution interpolation at the reduction ratios of 0.20, 0.25, and 0.50.

Therefore, in the present embodiment, as the method of dividing the reduction ratio into two stages in the reducing process deciding portion 5, the reduction ratio is divided into a fixed reduction ratio and a remaining fractional reduction ratio and the remaining fractional reduction ratio is assigned to the first reducing process and the fixed reduction ratio is assigned to the second reducing process. Accordingly, the reduction processing algorithm such as the nearest neighbor interpolation, the bi-linear interpolation, and the three-dimensional convolution interpolation, or the like, which puts the priority on a processing speed, is employed in the first reducing process, and also Super Sampling, or the like, which puts the priority on a high picture quality, is employed in the second reducing process.

Accordingly, when the thumbnail (74×105) with a reduction ratio of 0.015 is generated from the image data of 4,950× 7,000, for example, the reducing process deciding portion 5 informs the reduction processing portion 6 that the nearest neighbor interpolation should be applied at a reduction ratio of 0.15 in the first reducing process and Super Sampling should be applied at a reduction ratio of 0.10 in the second reducing process. As a result, the thumbnail of high picture quality can be generated at a high speed.

In other words, a designated reduction ratio is divided into a reduction ratio that can achieve a short processing time by the reduction processing algorithm that attaches importance to a picture quality (fixed reduction ratio) and a reduction ratio that is used to realize the designated reduction ratio while using the fixed reduction ratio (fractional reduction ratio). This fractional reduction ratio is given by x/y, where x is a designated reduction ratio and y is a fixed reduction ratio.

Here, the fixed reduction ratio is decided previously by the experiment shown in FIG. 2, and one fixed reduction ratio may be employed or a plurality of fixed reduction ratios may be employed. In case a plurality of fixed reduction ratios are employed, the fixed reduction ratio may decided depending on precedence of a picture quality or precedence of a processing speed.

Then, the reducing process deciding portion 5 instructs the reduction processing portion 6 to designate the reduction processing algorithm placing priority on a processing speed as the first reducing algorithm and designate the reduction processing algorithm placing priority on a picture quality as the second reducing algorithm.

As a result, the thumbnail of high picture quality can be generated at a high speed.

Then, explanation of a second embodiment (printing function) will be made hereunder.

As the conditions, the case where all input image data are the effective pixel and also the process in units of band is used as a processing mode is assumed.

Figure 3:
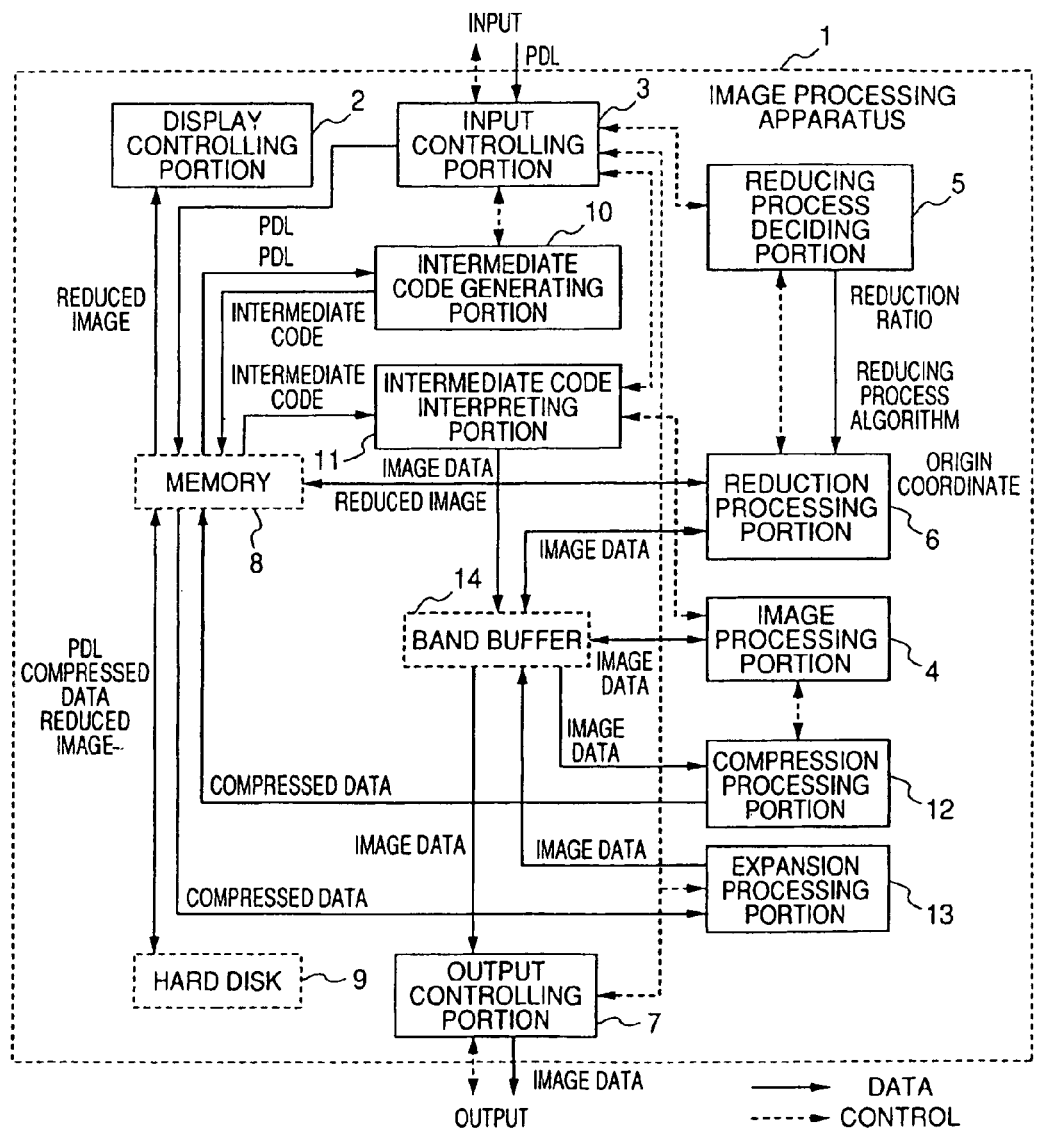
FIG. 3 is a schematic block diagram showing an image processing apparatus having a printing function.

FIG. 3 is a diagram showing a schematic block configurative example of the image processing apparatus 1 as the second embodiment. In FIG. 3, the same reference numbers are affixed to the processing portions having the same natures as those in FIG. 1, and their explanation will be omitted herein.

Here, respective processing portions constituting the image processing apparatus 1 are the display controlling portion 2, the input controlling portion 3, the image processing portion 4, the reducing process deciding portion 5, the reduction processing portion 6, the output controlling portion 7, the memory 8, the hard disk 9, an intermediate code generating portion 10, an intermediate code interpreting portion 11, a compression processing portion 12, an expansion processing portion 13, and a band buffer 14.

The image processing apparatus 1 is used herein commonly to implement the printing function. In the case of the printing function, normally the mode of the input data is not the image data (bit map) necessary for the printing but the format of PDL (Page Description Language) that the printer driver in the personal computer generates. This format is input into the input controlling portion 3 of the image processing apparatus 1 via the network. Also, the input controlling portion 3 is connected to the reducing process deciding portion 5, the output controlling portion 7, and the intermediate code interpreting portion 11, and exchanges the control mutually.

The input PDL is stored temporarily in an input buffer on the memory 8, and then stored in the hard disk 9 as the file or copied in another area on the memory 8 and then converted into the intermediate code sequentially by the intermediate code generating portion 10 and stored in a dedicated intermediate code holding area on the memory 8.

Then, when the conversion of PDL on one page into the intermediate code is completed, the intermediate code interpreting portion 11 interprets sequentially the intermediate code on the memory 8 in units of band and expands the image data on the band buffer 14.

Here, the contents of the image data expanded on the band buffer 14 are normally in the RGB dot sequential (24 bit/pixel) format. This is because the application on the personal computer generates the printing command including ROP (Raster Operation, the logical operation applied to the image) and correspondingly the printer driver converts ROP into PDL as it is.

Then, CMYK field sequential image data must be given as the output image data of the RGB dot sequential (24 bit/pixel) image data expanded on the band buffer 14. Therefore, the image processing portion 4 executes the color converting process and the dot-field converting process from RGB to CMYK, and the compression processing portion 12 compresses the CMYK field sequential data and hard disk 9 holds the compressed data via the memory 8. Then, the above processes are repeated over the whole band.

Here, since normally the display device displays the image in RGB, a time just after the image data is expanded on the band buffer 14 by the intermediate code interpreting portion 11 is convenient for a timing to generate the reduced image. In the present embodiment, a reduction ratio in the first reducing process and the reducing process algorithm are decided by the reducing process deciding portion 5 based on a page size of the input image data. Here, the case where the thumbnail (74×105) with a reduction ratio of 0.015 is generated from the image data of 4,950×7,000 is taken as an example, and a band width is set to 128 (thus, the number of band division is 55). Suppose under these conditions that the reducing process deciding portion 5 sets a reduction ratio in the first reducing process to 0.15 and also decides the nearest neighbor interpolation as the reduction processing algorithm.

Also, in the present embodiment, when the image data are input in units of band, the first reducing process executes the reducing process while using an (upper left) origin of the first band as an origin of all band processes. This is because there is no guarantee that the reciprocal of the reduction ratio is always given as an integral number and the band width is divisible by such integral number. In this embodiment, the reciprocal of the reduction ratio (first reduction ratio 0.15) is given as 6.666666 . . . and the band width is not divisible by this integral number. This means that, when the upper left coordinate of each band is employed as the origin of the pixels before the reducing process corresponding to the pixels of the image data calculated from the reciprocal of the reduction ratio after the reducing process, the Y coordinates of these pixels are shifted every band (see FIG. 4).

For this reason, the upper left coordinate of each band or each block is selected as the origin in the method of generating the thumbnail simply in units of band or in units of block like Patent Literature 1. As a consequence, the reduced image is generated by the wrong pixels depending on the reduction ratio (see FIG. 5).

Figure 4:
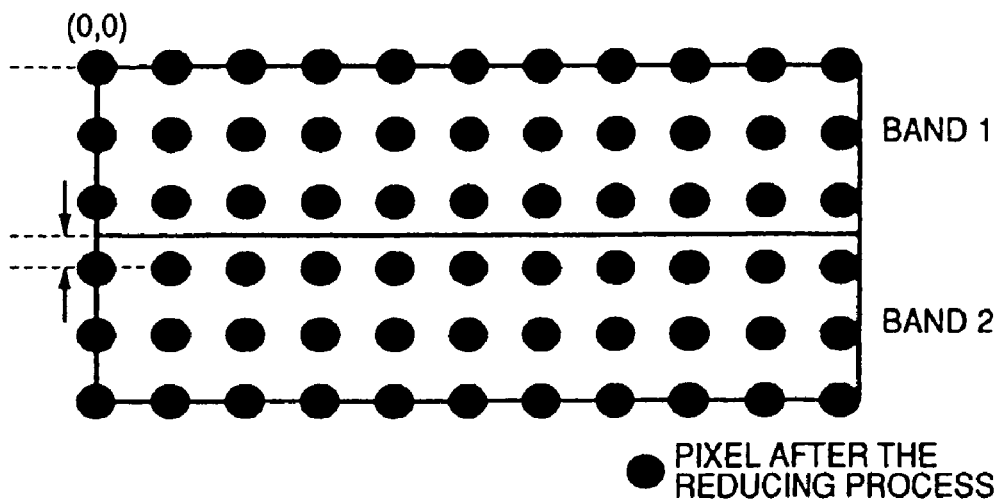
FIG. 4 is a view showing schematically a reducing process in band units in the present embodiment.
Figure 5:
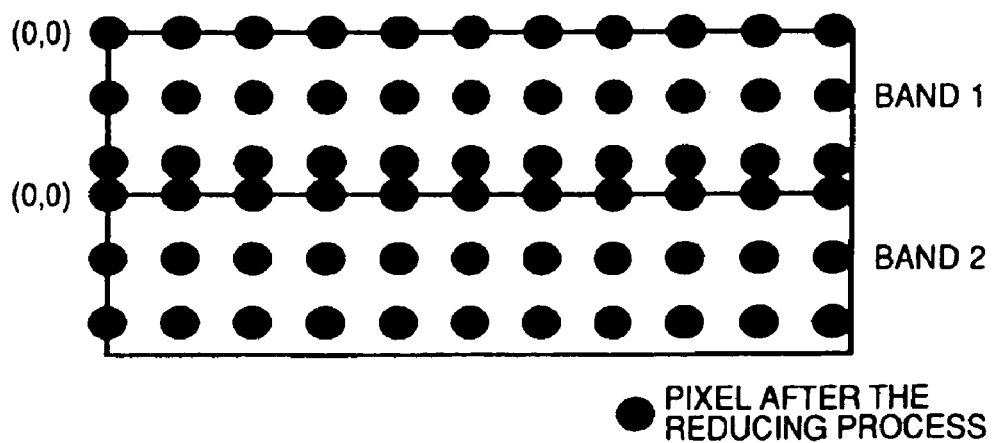
FIG. 5 is a view showing schematically a reducing process in band units in the prior art.

FIG. 4 shows the result of the reducing process in band units in the present embodiment. FIG. 5 shows the result of the reducing process in band units in the prior art.

On the uppermost line of a band 2 in FIG. 5, the pixels after the reducing process are arranged and these pixels come closer to the pixels after the reducing process on the lowermost line of a band 1 than the pixels in other bands. With this arrangement, the boundary between the bands can be recognized with the human eye and thus a picture quality is conspicuously deteriorated. This is because, although a length of the band after the reducing process in the longitudinal direction does not correspond to the length that can be given by the integral number, the coordinate system is cleared every band, i.e., the upper left coordinate is adopted as the origin (0, 0) every band. In contrast, in the result of the reducing process in the present embodiment shown in FIG. 4, the pixels after the reducing process are not arranged on the uppermost line of the band 2. That is, this is because the upper left coordinate of the band 1 is adopted as the origin (0, 0) and the upper left coordinate of the band 2 is set on the coordinate system being continued from the band 1. More concretely, the upper left coordinate of the band 2 represents the coordinate (0, 3.4), for example, and the coordinate system after the reducing process is calculated on the assumption that the upper left coordinate of the band 2 is set to (0, 3.4). Accordingly, the image is calculated on the proper coordinate system as a whole, and the boundary between the bands cannot be recognized with the human eye and thus a picture quality is improved.

Therefore, when the reducing process is applied to the image data stored in the band buffer 14, the lower left coordinate of the band that is being processed is set as the upper left coordinate of the subsequent band. In other words, the upper left coordinate of the band in the first reducing process is set to the origin (0, 0), but the reducing process deciding portion 5 informs the reduction processing portion 6 that the upper left coordinate of the band in the subsequent reducing process should be set to the lower left coordinate of the band in the preceding reducing process sequentially and that the origin should always be set to the upper left coordinate of the band in the first reducing process.

According to the above processes, the first reducing process (reduction ratio 0.15) is executed every band while using the origin (upper left point) of the first band as the origin in all band processes, and then the reduced image is held sequentially in the dedicated area on the memory 8. As a consequence, the RGB dot sequential (24 bit/pixel) reduced image consisting of the 742×1050 pixels can be obtained.

Subsequently, the reducing process deciding portion 5 decides the reduction ratio of 0.10 in the second reducing process and Super Sampling as the reduction processing algorithm, and informs the reduction processing portion 6 of them. Then, the reduction processing portion 6 executes the second reducing process. Finally, the RGB dot sequential (24 bit/pixel) thumbnail consisting of the 74×105 pixels can be obtained on the memory 8.

Also, the resultant thumbnail is stored in the hard disk 9 in a state that such thumbnail is linked with the original image (in this example, the CMYK field sequential compressed data in units of band). Then, such thumbnail is read from the hard disk 9 to the memory 8 in response to the instruction from the display controlling portion 2, and is displayed on the display controlling portion 2.

Also, the compressing process is applied to the image data expanded on the band buffer 14 by the compression processing portion 12, then the compressed data is stored in the memory 8, then the compressed data in the memory 8 is stored in the hard disk 9, and then the compressed data in the memory 8 is expanded by the expansion processing portion 13 to expand the original image data on the band buffer 14.

Figure 6:
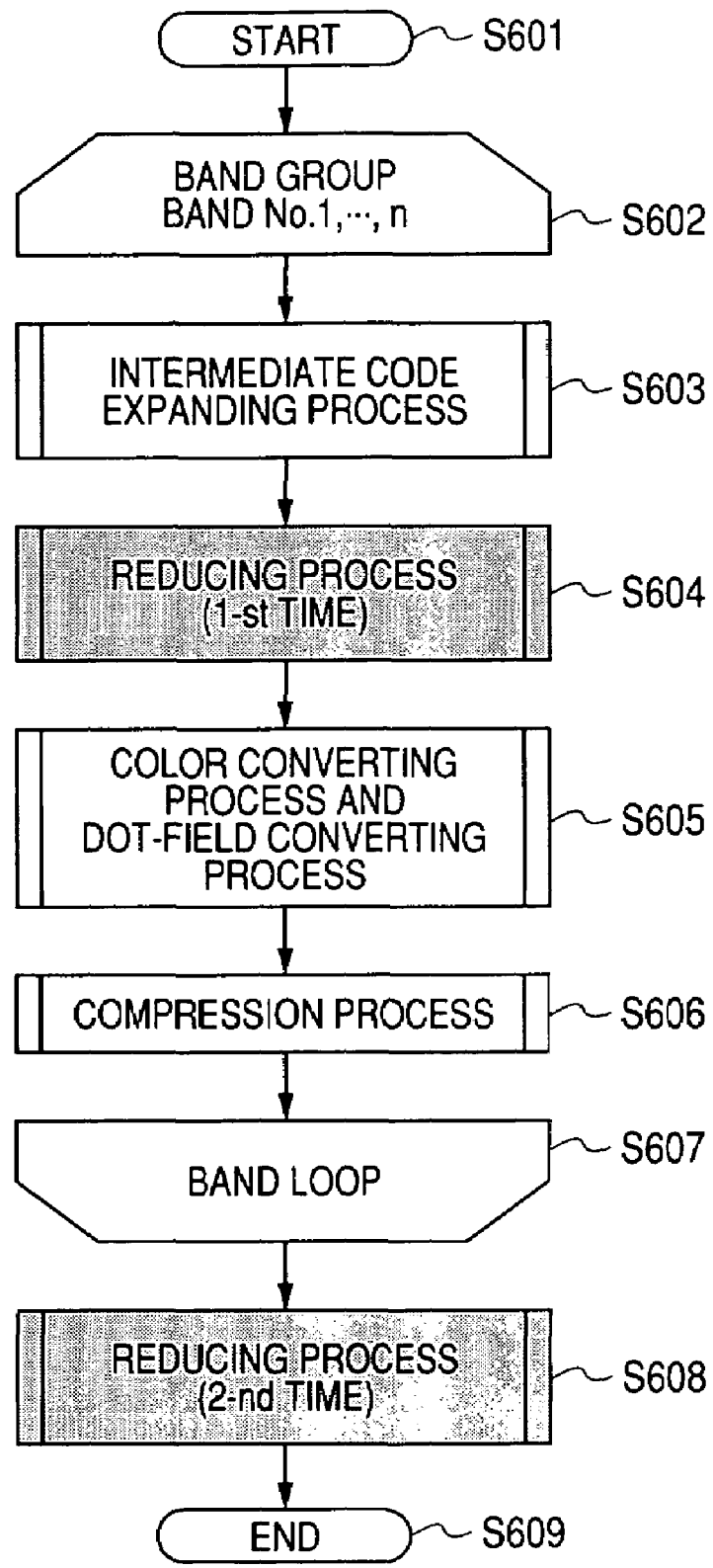
FIG. 6 is a flowchart showing an algorithm for generating a reduced image by a printing function in the present embodiment.

A series of processes mentioned above will be explained with reference to a flowchart in FIG. 6 hereunder. Processes from step S602 to step S607 are repeated the same times as the number of bands in one image (n times, 55 in the above example).

In step S603, intermediate code interpreting portion 11 expands the intermediate code to generate the image data on the band buffer 14.

In step S604, the first reducing process is applied to the generated image data by the reduction processing portion 6.

In step S605, the color converting process and the dot-field converting process (in the above example, the conversion of the RGB dot sequential image into the CMYK field sequential image) are applied to the original image data.

In step S606, the compression process is applied to the processed image and then stored in the hard disk 9 via the memory 8.

In step S608, the second reducing process (the reducing process that puts the priority on a picture quality, e.g., Super Sampling) is applied to the overall image that was subjected to the first reducing process.

Then, explanation of a third embodiment (scanning/copying functions) will be made hereunder.

As the conditions, the case where attribute information is attached to the input image data every pixel and also the process in units of page is used as a processing mode is assumed.

Figure 7:
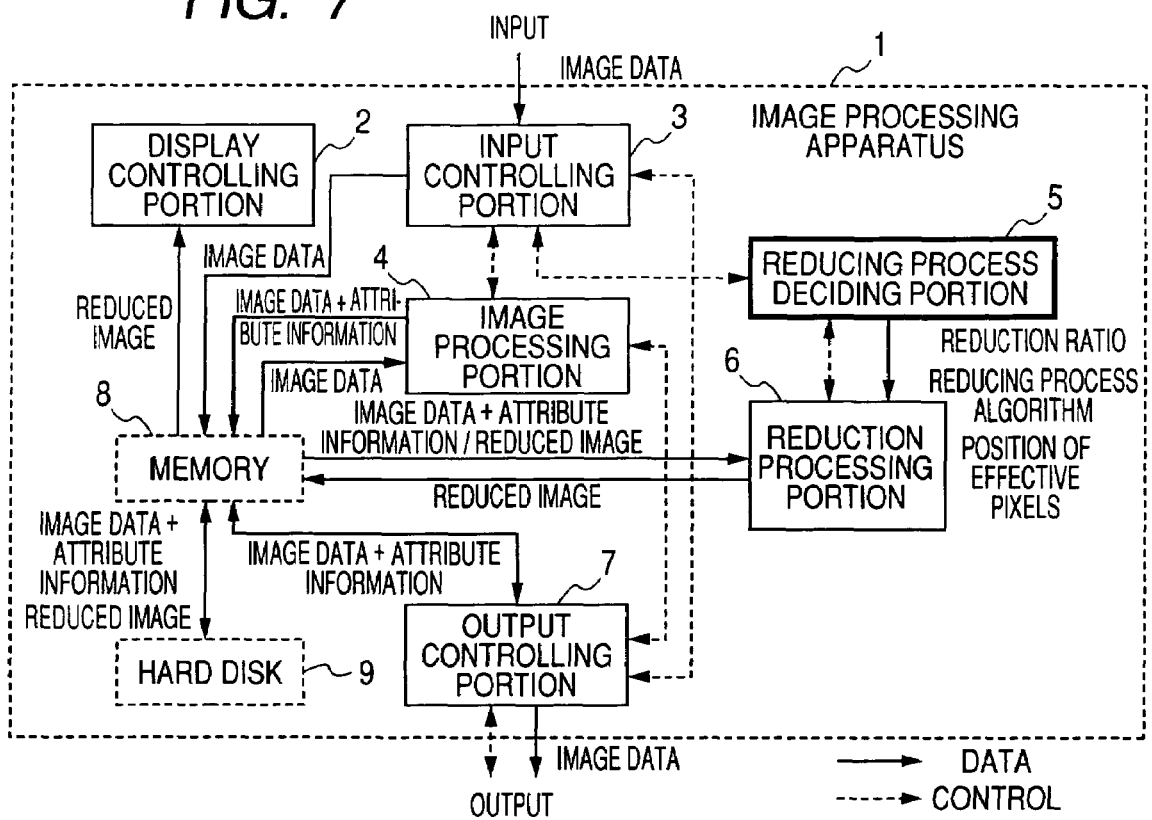
FIG. 7 is a schematic block diagram showing an image processing apparatus having scanning/copying functions.

FIG. 7 is a diagram showing a schematic block configurative example of the image processing apparatus 1 as the third embodiment. In FIG. 7, the same reference numbers are affixed to the processing portions having the same natures as those in FIG. 1.

Respective processing portions constituting the image processing apparatus 1 are the display controlling portion 2, the input controlling portion 3, the image processing portion 4, the reducing process deciding portion 5, the reduction processing portion 6, the output controlling portion 7, the memory 8, and the hard disk 9.

The image processing apparatus 1 is used herein to implement the scanning/copying functions. In the case of the scanning/copying functions, information on a sheet set on an ADF (Auto Document Feeder) or a platen is input into the input controlling portion 3 of the image processing apparatus 1 as the image data by the optical device such as CCD, or the like.

The input image data is expanded on the memory 8 in units of page, and then the rotation process, a change of page size, an N-up process, or the like is applied by the image processing portion 4 in response to the user's instruction. Here, normally the contents of the image data expanded on the memory 8 are the CMYK field sequential image. Then, explanation will be made while taking as an example the case where the dither process (binarization) is applied to the image data on the memory 8 and the attribute information is attached to respective pixels by the image processing portion 4.

Figure 8:
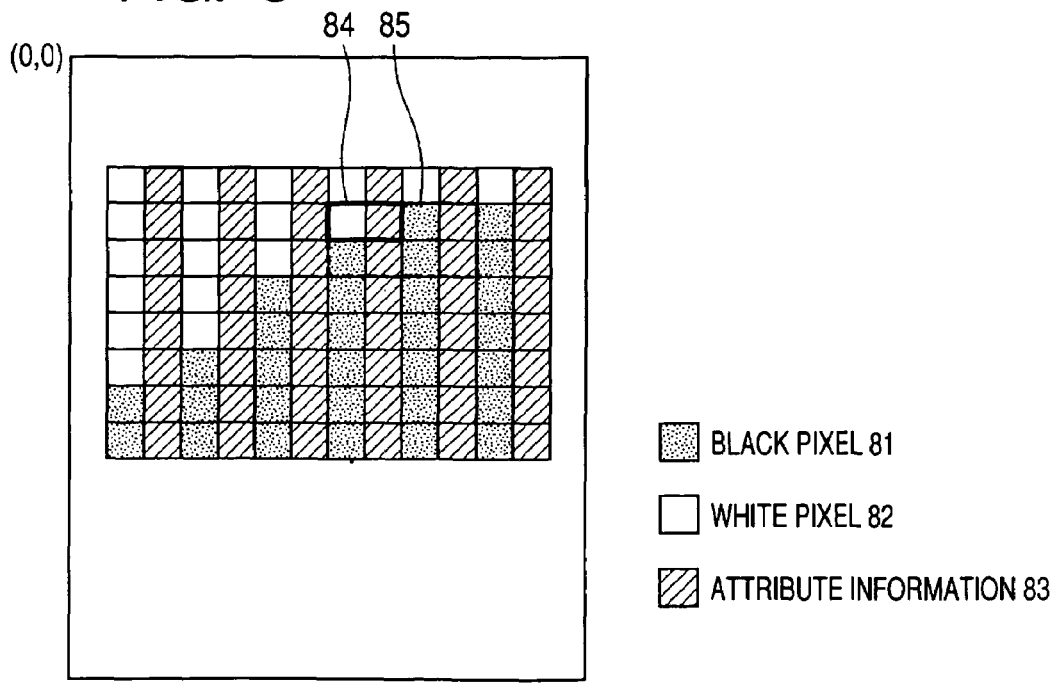
FIG. 8 is a view showing schematically a reducing process when attribute information is attached to each pixel in the present embodiment.

A timing at which the image data at a time point when the image data is stored in the hard disk 9 can be reflected is desirable as the timing to generate the reduced image. Therefore, such timing should be selected preferably after all image processings executed by the user's instruction are completed. The contents of image data after the image processing in the present embodiment is totally completed are shown in FIG. 8. FIG. 8 shows a situation that attribute information is attached to each pixel. Attribute information 83 adjacent to the pixel (a black pixel 81 or a white pixel 82) is paired with the pixel.

In the present embodiment, the processing method that put the priority on a processing speed is employed as the first reducing process. Here, the dither process (binarization) is applied to the image data as the object of the reducing process and attribute information 83 is attached to each pixel. Therefore, the reducing process deciding portion 5 informs the reduction processing portion 6 to specify the pixel nearest to the coordinate calculated by the nearest neighbor interpolation and its attribute information 83 (frame A 84 in FIG. 8) and then pick up only the pixel. Accordingly, the attribute information 83 unnecessary for the reduced image is deleted.

Here, since the image data before the reduction is subjected to the dither process, it is unreasonable to decide the pixel value after the reduction only by one pixel. Therefore, it is apparent that the method such as the bi-linear interpolation, the three-dimensional convolution interpolation, or the like to take the surrounding pixel values into consideration should be employed preferably. However, because the image data prior to the reduction is the binary data, the common method in which the pixel value is decided by the majority rule or the pattern comparison is more effective than the bi-linear interpolation or the three-dimensional convolution interpolation in which the coordinate value is calculated by the computation from the surrounding pixel values. In this example, the case where the pixel value is decided by the majority rule is illustrated. For example, in FIG. 8, the pixel value becomes white (frame A 84 in FIG. 8) when the pixel value is decided only by the nearest neighbor interpolation, while the pixel value becomes black (frame B 85 in FIG. 8) when the pixel value is decided from four pixels containing three surrounding pixels by the majority rule.

Since the above approaches are applied to the reduced pixel and its surrounding pixels corresponding to the pixel after all reducing processes, the reduced image can be obtained at a high speed and also the attribute information 83 can be easily removed.

Here, it is described in the second embodiment that normally the display device displays in RGB (24 bit/pixel). In contrast, since the reduced image format after the first reducing process in the third embodiment to realize the scanning/copying functions is the CMYK field sequential (1 bit/pixel) or K (1 bit/pixel), the multi-value process, the color converting process from CMYK to RGB, and the field-dot converting process are required to display on the display device.

In the present embodiment, first the reducing process based on the second high picture quality algorithm is applied to the reduced image after the first reducing process, and then the multi-value process, the color converting process from CMYK to RGB, and the field-dot converting process are carried out. Thus, the multi-value process, the color converting process from CMYK to RGB, and the field-dot converting process can be sped up.

Figure 9:
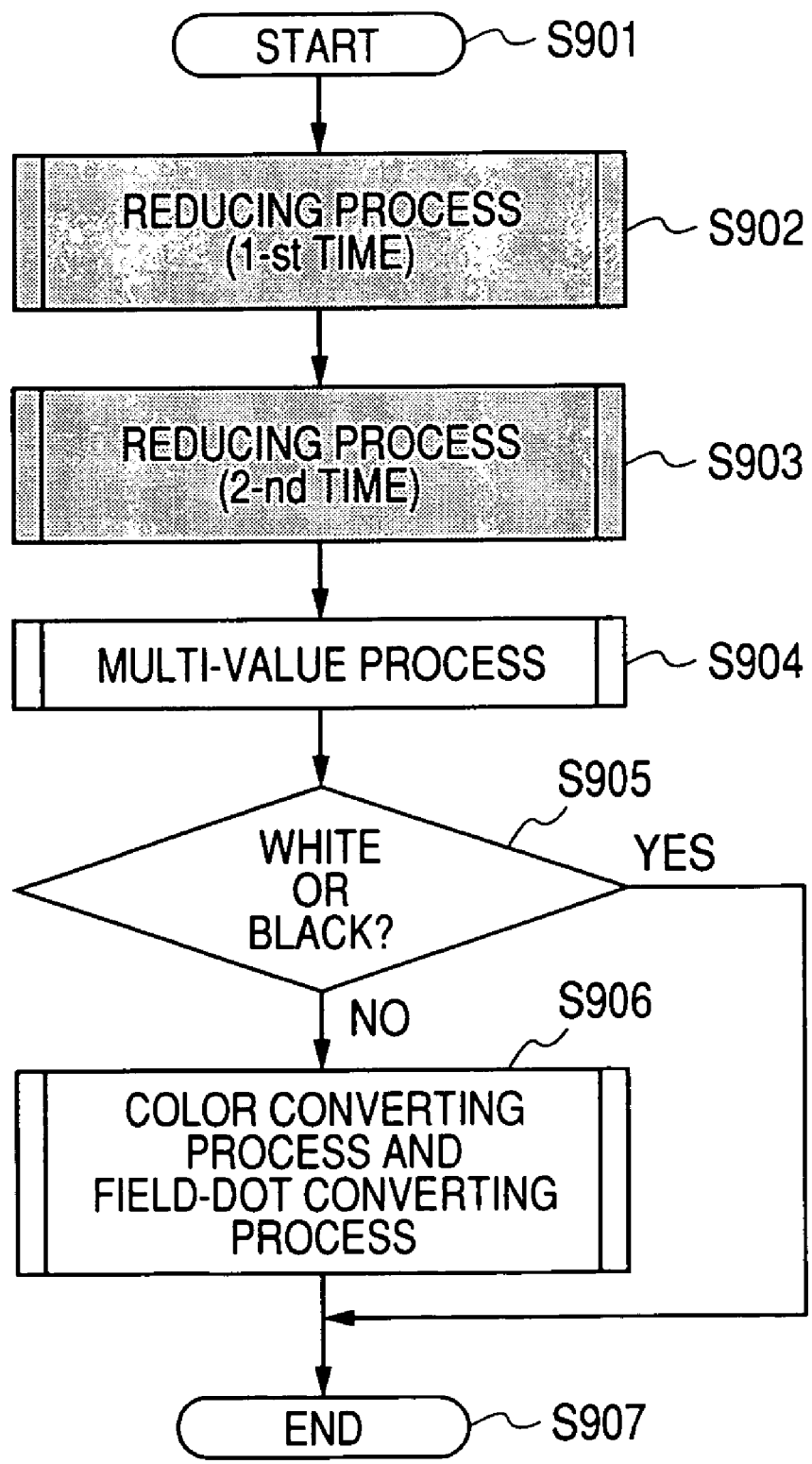
FIG. 9 is a flowchart showing an algorithm for generating a reduced image by scanning/copying functions in the present embodiment.

A series of foregoing processes will be explained with reference to a flowchart in FIG. 9 hereunder.

In step S902, the first reducing process is executed. Accordingly, the attribute information 83 attached to each pixel can be deleted.

In step S903, the second reducing process is executed. Both the first reducing process and the second reducing process are similar to the process in the first embodiment.

In step S904, the multi-value process is executed to cause the display device to display, because the color space of the display device is usually RGB (24 bit/pixel).

In step S905, it is decided whether the reduced image is white or black. This is because, if the reduced image format is K (1 bit/pixel), the color converting process and the field-dot converting process are not needed. If the reduced image format is K (1 bit/pixel), the process is ended in step S907.

In step S906, the color converting process and the field-dot converting process are executed since the reduced image format is the CMYK field sequential (1 bit/pixel).

Now the program explained above can be stored in the recording medium. In such case, the present invention can be grasped as the invention given as follows, for example.

The image processing apparatus readable recording medium for recording the image processing program that can cause the image processing apparatus to execute the image processing to generate the reduced image from the input image data, wherein the image processing program causes the image processing apparatus to realize a reducing process dividing function for dividing the reducing process of obtaining the reduced image from the input image data into two stages; and an image reducing function for executing the reducing process in compliance with two divided reducing processes.

The wording "the image processing apparatus readable recording medium for recording the program" signifies the image processing apparatus readable recording medium for recording the program used to install, execute, distribute the program, and the like.

Here, as the recording medium, for example, the digital versatile disc (DVD) such as "DVD-R, DVD-RW, DVD-RAM, etc." as the standard stipulated by the DVD forum, "DVD+R, DVD+RW, etc." as the standard stipulated by the DVD+RW, and the like, the compact disc such as CD read only memory (CD-ROM), CD recordable (CD-R), CD rewritable (CD-RW), and the like, the magneto optics disc (MO), the floppy disk (FD), the magnetic tape, the hard disk, the read only memory (ROM), the electrically erasable and programmable read only memory (EEPROM), the flash memory, the random access memory (RAM), and others are contained.

Also, the above programs or a part of them can be recorded in the recording medium and saved, distributed, and the like. Also, the above programs or a part of them can be transmitted via the communication, e.g., the wire network or the wireless communication network used in the local area network (LAN), the metropolitan area network (MAN), the wide area network (WAN), the Internet, the intranet, the extranet, or the like, or the communication medium consisting of their combination, or the like. Also, the above programs or a part of them can be superposed on a carrier wave and transmitted.

In addition, the above program may be prepared as a part of other programs, or the above program together with the separate programs may be recorded on the recording medium.

What is claimed is:

1. An image processing apparatus that generates a reduced image from input image data, which comprises:
    a reducing process dividing device that divides a reducing process applied to get the reduced image from input image data into a first and second reducing process and that divides a reduction ratio into a fixed reduction ratio and a fractional reduction ratio;
    a reducing process designating device that assigns the fractional reduction ratio to the first reducing process, that assigns the fixed reduction ratio to the second reducing process, and that assigns parameters depending on the input image data to the first reducing process; and
    an image reducing device that executes the reducing process in compliance with the first and second reducing process, wherein
    the first reducing process includes at least one of a nearest neighbor interpolation algorithm, a bi-linear interpolation algorithm, and a three-dimensional convolution interpolation algorithm,
    the second reducing process includes at least a Super Sampling algorithm, and
    the fixed reduction ratio is set such that a processing time of the second reducing process is shorter than or substantially equal to a processing time of the first reducing process.

2. The image processing apparatus according to claim 1, wherein the fixed reduction ratio is one of 0.10, 0.20, 0.25, and 0.50.

3. An image processing method that generates a reduced image from input image data, which comprises:
    dividing a reducing process applied to get a reduced image from input image data into a first and second reducing process;
    dividing a reduction ratio into a fixed reduction ratio and a fractional reduction ratio;

assigning the fractional reduction ratio to the first reducing process;

assigning the fixed reduction ratio to the second reducing process;

assigning parameters depending on the input image data to the first reducing process; and executing the reducing process in compliance with the first and second reducing process, wherein the first reducing process includes at least one of a nearest neighbor interpolation algorithm, a bi-linear interpolation algorithm, and a three-dimensional convolution interpolation algorithm, the second reducing process includes at least a Super Sampling algorithm, and the fixed reduction ratio is set such that a processing time of the second reducing process is shorter than or substantially equal to a processing time of the first reducing process.

4. A non-transitory computer readable medium storing a program causing a computer to execute a process for executing an image processing that generates a reduced image from input image data, the process comprising:

dividing the reducing process of obtaining the reduced image from the input image data into a first and second reducing process;

dividing a reduction ratio into a fixed reduction ratio and a fractional reduction ratio;

assigning the fractional reduction ratio to the first reducing process;

assigning the fixed reduction ratio to the second reducing process;

assigning parameters depending on the input image data to the first reducing process; and executing the reducing process in compliance with the first and second reducing process, wherein the first reducing process includes at least one of a nearest neighbor interpolation algorithm, a bi-linear interpolation algorithm, and a three-dimensional convolution interpolation algorithm, the second reducing process includes at least a Super Sampling algorithm, and the fixed reduction ratio is set such that a processing time of the second reducing process is shorter than or substantially equal to a processing time of the first reducing process.

* * * * *